2,752,396
CARBONYLATION OF OLEFIN-DIOLEFIN MIXTURES

Philip Geoffrey Harvey and Arthur William Charles Taylor, Norton-on-Tees, England, assignors to Imperial Chemical Industries Limited, London, England, a corporation of Great Britain No Drawing. Application November 28, 1951, Serial No. 258,752

Claims priority, application Great Britain September 12, 1949

6 Claims. (Cl. 260—604)

This invention relates to the production of oxygen-containing organic compounds and is a continuation-in-part of application Serial No. 180,705, filed August 21, 1950, now abandoned.

It has previously been common practice in the carbonylation of olefines to employ as carbonylating gas a mixture of carbon monoxide and hydrogen in which the molar ratio $CO:H_2$ was 1:1 since this gives the stoichiometric proportions for direct addition to the double bond, but gas of this composition has a strongly corrosive effect on ordinary steel equipment. When the attempt is made to carbonylate alkenes containing also di- and/or poly-enes using less corrosive gas mixtures and a dissolved cobalt compound as catalyst, it has now been found that carbonylation is inhibited, apparently owing to the presence of these last two classes of compounds. However, it has been found possible according to the present invention by having present initially an inert medium, and using gas mixtures having compositions, and concentrations of dissolved cobalt compounds, both as hereinafter defined, to carbonylate these mixtures.

Moreover, the process of the present invention is economic in the sense that it gives high conversions and outputs from these starting materials, which are so difficult to carbonylate. An additional advantage of the invention is that it permits the return of large quantities of hydrogen from the later carbonyl decomposition zone and from the hydrogenation step, to the carbonylation step and the use as feed gas in the last mentioned step of water gas with a $CO:H_2$ ratio of 1:1. This affords considerable economy in the overall process. Furthermore, by using carbonylating gas having the low CO ratios claimed the need for costly CO-resistant apparatus is dispensed with. Besides, to the best of available knowledge, no one has been successful in continuously carbonylating olefines from cracked paraffins using the low $CO:H_2$ ratios described in the present specification without prior treatment of the alkene mixture.

According to the present invention oxygen-containing organic compounds, especially aldehydes, are produced by carbonylating alkene mixtures containing C4 and higher alkenes, especially alpha-alkenes, together with di- and/or poly-enes, which may be alicyclic or aliphatic, in the following manner: forming an active carbonylating catalyst in a liquid organic medium substantially inert under the reaction conditions by passing thereinto at superatmospheric pressure and elevated temperature a mixture comprising CO and $H_2$, in which the partial pressure of CO is at least 50 atmospheres and the molar ratio of $CO:H_2$ is at least 1:5, preferably at least 1:3, in the presence as catalyst of at least 0.01%, preferably at least 0.1%, by weight of cobalt, calculated as metal, dissolved in the liquid, and thereafter feeding to this prepared mixture while contained in the same or a different reactor a mixture of carbon monoxide and hydrogen, in which the molar ratio $CO:H_2$ is from 3:7 to 2:3 together with the alkene feed containing di- and/or poly-enes, and continuing to carbonylate the mixture while maintaining the concentration of dissolved cobalt in the carbonylation zone at at least 0.1% by weight of the liquid.

The use as catalyst of a soluble organic compound in solution affords the advantages that it permits very accurate continuous control of cobalt concentration in the reaction space, which is extremely important in a sensitive reaction like the Oxo-process, and that, in contrast to catalyst suspensions, the reaction mixture can be easily pumped and erosion of valves and choking of lines can be substantially eliminated. The inhibiting effect of di- and/or poly-enes is very marked when active carbonylating catalyst is to be formed from dissolved organic cobalt compounds. Moreover, the ability to use with difficult alkene mixtures of this sort the low cobalt proportions specified, viz., 0.1%, results in considerable saving of this costly metal.

It is a further advantage of the present invention that it is possible to operate throughout with a carbonylating gas mixture in which the $CO:H_2$ ratio does not exceed 2:3 and which, therefore, is less corrosive to ordinary steel.

The process of the invention is specially applicable to mixtures containing from C4 to C18 mono-olefines, in particular those containing up to 12 carbon atoms. Such mixtures may contain cyclic mono-olefines in appreciable amounts.

While the invention is not to be considered as depending on any particular theory, it is believed that di- and poly-enes, especially those which are conjugated, inhibit the carbonylation.

Di- and poly-enes are distinguished by having higher densities and refractive indices than the corresponding mono-olefines, and their presence is indicated by refractive index measurement, infra red spectroscopy or density measurement.

The invention is of especial value for the carbonylation of alkenes containing, for example, C6–C8 mono-olefines produced by thermal cracking of hydrocarbons, e. g., paraffin wax.

Generally suitable reaction conditions are 130°–190° C. preferably 150°–175° C., and 200 to 300 atmospheres gauge (preferably 250 atmospheres) of mixed carbon monoxide and hydrogen.

Suitable inert media, non-injurious to the carbonylation process are for example, saturated butene trimer, hydrogenated alcohol product, high-boiling paraffinic hydrocarbons, e. g., C16 hydrocarbons, and high boiling residues comprising ethers and ether alcohols obtained from the hydrogenation product of the carbonylated material. While C4 and C5 alkenes are liquid within partial ranges of the reaction conditions it is nevertheless desirable with them to introduce an inert medium as well as the C4 and C5 alkene feed in order to permit liquid phase operation throughout the whole range of reaction conditions.

Preferably the cobalt is introduced as a soluble salt of an organic acid dissolved in the liquid medium, e. g., cobalt naphthenate, acetate, laurate, hexahydrobenzoate or 3,5,5-trimethyl hexoate. The desired concentration of cobalt may be maintained in the reaction zone by, for example, dissolving the soluble cobalt compound in the alkene feed or a portion thereof, or by introducing it as a solution in an inert medium non-injurious to the carbonylation reaction.

Saturated aldehydes produced by the process of the invention can be readily hydrogenated to the corresponding alcohol, using for example, a copper or nickel catalyst and pressures of about 250 atmospheres gauge. Copper-on-zinc oxide and copper-on-chromia are especially suitable for the hydrogenation step.

The invention is illustrated by the following example.

Example (i) Operating according to the prior art process pure di-isobutene containing 0.1% of cobalt as naphthenate was fed to a reaction zone at 155° C. and 250 atmospheres pressure together with a mixture of carbon monoxide and hydrogen in which the mole ratio carbon monoxide monoxide: hydrogen was 1:3 in the proportion of 1000 cubic metres of free gas per cubic metre of di-isobutene, the liquid space velocity being 0.5 litre per litre of free reaction space per hour. Carbonylation was initiated immediately and there were obtained oxygenated organic compounds containing 3,5,5-trimethylhexanal. When the inlet gas was cut off the reaction ceased, but re-started immediately on reintroduction of the carbonylating gas.

(ii) The process was repeated under the same conditions as given in paragraph (i) except that the di-isobutene feed was replaced by diisobutene containing 5% of cyclopentadiene. After passing the same carbonylating gas for 2 hours it was found that no carbonylation had occurred.

(iii) Operation according to the process of the present invention will now be described using an alkene feed which trial showed could not be carbonylated under the conditions described in paragraphs (i) and (ii) above.

A reactor is filled initially with a saturated C7 to C9 aliphatic mono-alcohol mixture containing 0.1% by weight cobalt as naphthenate and treated at a gas rate of 500 cubic metres per cubic metre of empty reaction space per hour with a mixed gas consisting of 25% CO and 75% $H_2$ at a pressure of 250 atmospheres gauge and temperature of 150° to 160° C., for a period of at least 30 minutes. The liquid alkene feed, comprising substantially C6 to C8 alpha monoolefines obtained by the thermal cracking of paraffin wax, containing 0.1% by weight of dissolved cobalt as naphthenate is then injected continuously to the reactor at a liquid space velocity of 0.5 litre/litre/hour with a simultaneous mixed gas feed containing 30% CO to give a gas:liquid feed volume rate of 1000 cubic metres/cubic metre at a temperature of 150° to 175° C. and the above pressure, when a pass conversion to oxygenated compounds of about 80% is obtained.

Operating according to the process of the invention the main end products obtained, after hydrogenation of the carbonylation product, from Cn normal olefines are the normal Cn+1 alcohol and the 2-methyl-Cn alcohol (where n=the number of carbon atoms). Thus normal heptanol and 2-methyl hexanol are obtained from normal hexene, and the corresponding normal and 2-methyl alcohols from normal heptene and octene. Other isomeric alcohols are also produced in minor amounts.

I claim:

1. A continuous process for the production of aldehydes by carbonylating an olefine mixture produced by the cracking of hydrocarbons and containing alkenes having at least four carbon atoms in the molecule and a minor amount of at least one olefine selected from the group consisting of aliphatic and alicyclic di- and polyenes which comprises initially preforming a large bulk of a solution of cobalt carbonyl catalyst in an inert organic medium by treating therein a solution of a dissolved organic compound of cobalt in a concentration equivalent to at least 0.01% of cobalt metal under superatmospheric temperature and pressure with a carbon monoxide/hydrogen gas mixture having a $CO:H_2$ molar ratio of at least 1:5 and having a carbon monoxide partial pressure of at least 50 atmospheres and thereafter introducing and continuously feeding to said initially formed bulk of cobalt carbonyl solution said olefine mixture at 130° to 190° C. and at 200 to 300 atmospheres, while maintaining the concentration of cobalt at small concentration of not less than 0.1% of cobalt metal by weight of the said olefine mixture by introducing a soluble organic compound of cobalt in solution and a carbon monoxide/hydrogen gas mixture in which the molar ratio of $CO:H_2$ is from 3:7 to 2:3.

2. A process as claimed in claim 1 in which the said alkene contains from 4 to 12 carbon atoms in the molecule.

3. A process as claimed in claim 1 in which the molar ratio $CO:H_2$ of the gas used to form said catalyst in the inert solvent does not exceed 2:3.

4. A process as claimed in claim 1 in which the alkene mixture comprises C6–C8 mono-olefines obtained by the thermal cracking of higher hydrocarbons.

5. A process as claimed in claim 1 wherein the cobalt concentration in the formation of said catalyst is at least 0.1% by weight.

6. A process as claimed in claim 1, in which conjugated di- and poly-enes are present in the alkene mixture.

References Cited in the file of this patent

UNITED STATES PATENTS

| | | |
|---|---|---|
| 2,437,600 | Gresham et al. | Mar. 9, 1948 |
| 2,473,993 | Gresham et al. | June 21, 1949 |
| 2,477,554 | McKeever | July 26, 1949 |
| 2,497,303 | Gresham et al. | Feb. 14, 1950 |
| 2,530,989 | Parker | Nov. 21, 1950 |
| 2,587,858 | Keulemans | Mar. 4, 1952 |
| 2,647,149 | Condit et al. | July 28, 1953 |

OTHER REFERENCES

Wender et al.: "Critical Review of Chemistry of Oxo Synthesis," Bureau of Mines Report R. I. 4270, June 1948, pgs. 4, 5, 6.